(12) United States Patent
Manouvrier

(10) Patent No.: US 9,507,181 B2
(45) Date of Patent: Nov. 29, 2016

(54) POSITIVE COEFFICIENT DYNAMIC ELECTRO-OPTICAL PHASE SHIFTER

(71) Applicant: STMICROELECTRONICS SA, Montrouge (FR)

(72) Inventor: Jean-Robert Manouvrier, Echirolles (FR)

(73) Assignee: STMICROELECTRONICS SA, Montrouge (FR)

( * ) Notice: Subject to any disclaimer, the term of this patent is extended or adjusted under 35 U.S.C. 154(b) by 0 days.

(21) Appl. No.: 15/198,114

(22) Filed: Jun. 30, 2016

(65) Prior Publication Data

US 2016/0313578 A1 Oct. 27, 2016

Related U.S. Application Data

(62) Division of application No. 14/283,340, filed on May 21, 2014, now Pat. No. 9,405,137.

(30) Foreign Application Priority Data

May 31, 2013 (FR) ...................................... 13 54977

(51) Int. Cl.
| | |
|---|---|
| *G02F 1/025* | (2006.01) |
| *G02F 1/225* | (2006.01) |
| *G02B 6/12* | (2006.01) |
| *H04B 10/54* | (2013.01) |
| *H04B 10/548* | (2013.01) |

(52) U.S. Cl.
CPC ................. *G02F 1/025* (2013.01); *G02B 6/12* (2013.01); *G02F 1/2257* (2013.01); *H04B 10/548* (2013.01)

(58) Field of Classification Search
CPC . G02B 6/12142; G02F 1/025; G02F 1/2257; H04B 10/542
See application file for complete search history.

(56) References Cited

U.S. PATENT DOCUMENTS

| | | | |
|---|---|---|---|
| 4,958,898 | A | 9/1990 | Friedman et al. |
| 4,997,246 | A | 3/1991 | May et al. |
| 6,298,177 | B1 | 10/2001 | House |
| 2009/0310901 | A1 | 12/2009 | Dong |

OTHER PUBLICATIONS

Tada et al, "Bipolar Transistor Carrier-Injected Optical Modulator/Switch: Proposal and Analysis", IEEE Electron Device Letters, vol. EDL-7, No. 11, Nov. 1986, pp. 605-606.

*Primary Examiner* — Jerry Rahll
(74) *Attorney, Agent, or Firm* — Allen, Dyer, Doppelt, Milbrath & Gilchrist, P.A.

(57) ABSTRACT

A semiconductor electro-optical phase shifter may include an optical action zone configured to be inserted in an optical waveguide, and a bipolar transistor structure configured so that, in operation, collector current of the bipolar transistor structure crosses the optical action zone perpendicular to the axis of the optical waveguide.

22 Claims, 2 Drawing Sheets

POSITIVE COEFFICIENT DYNAMIC ELECTRO-OPTICAL PHASE SHIFTER

FIELD OF THE INVENTION

The invention relates to semiconductor optical modulators, in particular to electro-optical phase shifters used in such modulators.

BACKGROUND OF THE INVENTION

FIG. 1 schematically shows an optical modulator according to the Mach-Zehnder interferometer principle, commonly referred to as an MZI modulator. The modulator includes an optical waveguide that receives power $P_{in}$, which is divided into two branches 12a and 12b at a point S. The two branches come together again at a point J. Each branch carries half of the original optical power.

Each branch comprises a static electro-optical phase shifter SPS (SPSa and SPSb) and a dynamic electro-optical phase shifter DPS (DPSa and DPSb). The static phase shifters SPS are used to define an initial phase difference $\phi_0$ between the two optical waveguide branches. They are controlled by respective bias signals IBa and IBb. The dynamic phase shifters DPS are used to perform a differential modulation around the initial conditions defined by the SPS phase shifters. They are controlled by respective modulation signals M and M/ varying in phase opposition.

The waves arriving on both branches of the modulator are added at point J. The resulting wave has a power of $P_{in} \cdot \cos^2(\Delta\phi/2)$, neglecting the optical losses, where $\Delta\phi$ is the instantaneous phase difference between the waves of the two branches.

FIG. 2 is a perspective view of the waveguide branches 12a and 12b incorporating phase shifters SPS and DPS, shown in gray. As shown, the waveguides are formed in transparent islands, made of intrinsic semiconductor material, having an inverted "T" section, the central portion of which transmits the optical beam. The phase shifters are configured to replace waveguide segments and have the same inverted "T" cross section. The edges of the phase shifters bear electrical contacts used to control the phase shifters—they usually extend above the plane of the waveguide, as shown, to reach the metal levels.

FIG. 3A is a schematic sectional view of a DPS phase shifter referred to as a High-Speed Phase Modulator (HSPM). The cross section plane is perpendicular to the axis of the optical waveguide. A dotted circle, at the thicker central region, represents the region crossed by the optical beam, which is hereinafter referred to as the "optical action zone".

The phase shifter comprises a semiconductor structure, typically silicon, forming a P-N junction 14 in a plane parallel to the axis of the waveguide, and offset relative thereto. The junction 14 is shown, for example, at the right side face of the waveguide.

A P-doped zone extends to the left of junction 14, which has a cross section conforming to the cross section of the waveguide, namely elevated in the center and lower at the edge. Zone P ends at its left by a P+ doped raised area, bearing an anode contact A.

An N-doped zone extends to the right of the junction 14, conforming to the cross section of the waveguide. The zone N ends to the right by an N+ doped raised area, bearing a cathode contact C. The structure of the phase shifter may be formed on an insulating substrate, for example a buried oxide layer BOX.

For controlling the phase shifter of FIG. 3A, a voltage is applied between the anode and cathode contacts A, C, which reverse biases the junction 14 (the '+' on the cathode and the '−' on the anode). This configuration causes a displacement of electrons e from the N region to the cathode and of holes h from the P region to the anode, and the creation of a depletion region D in the vicinity of the junction 14. The carrier concentration is thus modified in accordance with the magnitude of the bias voltage in the area crossed by the optical beam, which results in a corresponding modification of the refractive index of this area. More specifically, this type of phase shifter has a negative coefficient in that an increase in bias voltage causes a decrease in the phase shift.

FIG. 3B is a schematic sectional view of a P-I-N junction SPS phase shifter. The P and N-doped central regions of the structure of FIG. 3A have been replaced by a single intrinsic semiconductor zone I, which, in practice, is a zone having a minimal P doping level. For controlling this phase shifter, a current is applied between the anode and cathode contacts A and C, which forward biases the junction (the '−' on the cathode and the '+' on the anode). A current establishes between the anode and the cathode causing the injection of carriers in the intrinsic zone I (holes h from the P+ region to zone I and electrons e from the N+ region to zone I). Thus, changes in the current induce changes in the carrier concentration, which in turn modify the refractive index of the optical action zone. More specifically, this type of phase shifter has a positive coefficient in that an increase of the bias current results in an increase of the phase shift.

PIN phase shifters typically have a slow response compared to HSPM shifters, but they offer a wider range of adjustment, which is why they may be used to set the quiescent conditions of the modulator.

SUMMARY OF THE INVENTION

In some applications, a positive coefficient dynamic phase shifter may be desirable. PIN phase shifters have a positive coefficient, but they are often too slow to be used as dynamic phase shifters.

This desire may be is addressed by a semiconductor electro-optical phase shifter comprising an optical action zone configured to be inserted in an optical waveguide. The semiconductor electro-optical phase shifter also includes a bipolar transistor structure configured so that, in operation, the collector current of the transistor crosses the optical action zone perpendicular to the axis of the waveguide.

According to an embodiment, the phase shifter comprises a first P-N junction parallel to the axis of the waveguide formed in the optical action zone between a first area doped at a first conductivity type and a second area doped at a second conductivity type. A second P-N junction is parallel to the first junction, formed between the second area and a third area doped at the first conductivity type. Collector, base, and emitter terminals of the transistor in contact respectively with the first, second, and third areas.

According to an embodiment, the first and second junctions are arranged so that the flux of the base-emitter current of the transistor does not penetrate into the optical action zone.

According to an embodiment, the doping level of the optical action zone may be at a minimum level. The doping level increases from the optical action zone towards each of the collector, emitter, and base terminals.

According to an embodiment, the first and second areas extend over the entire length of the phase shifter along the axis of the waveguide. The third area extends over part of the length of the phase shifter.

According to an embodiment, the third area extends over a central portion of the length of the phase shifter and the phase shifter comprises two islands arranged in contact with the second area on either side of the third zone. The two islands have a maximum doping level of the second conductivity type and are connected to form in common the base terminal.

According to an embodiment, the phase shifter comprises, in contact with the first area, several islands spaced apart along the length of the phase shifter, having a maximum doping level of the first conductivity type and being connected to form, in common, the collector terminal.

A phase shifter of the above type may be controlled by applying to the bipolar transistor a constant non-zero base-emitter bias current. The phase shifter may also be controlled by modulating the collector voltage of the transistor.

DETAILED DESCRIPTION OF THE PREFERRED EMBODIMENTS

Figure 1:
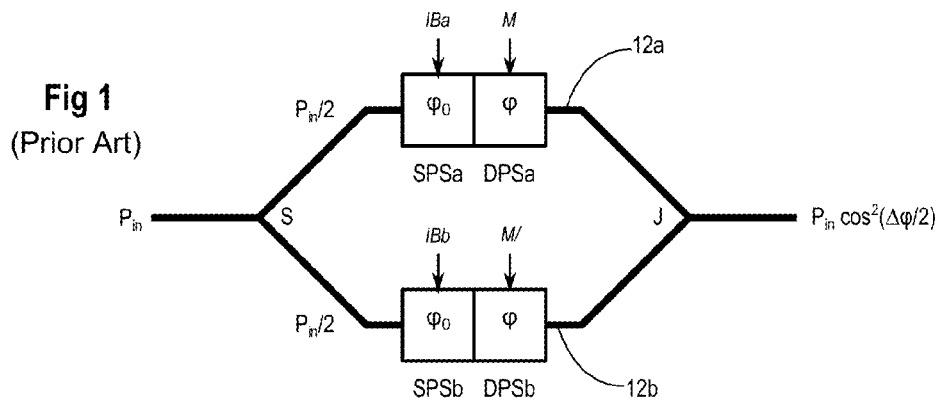
FIG. 1 schematically shows an optical modulator according to the Mach-Zehnder interferometer principle (MZI) in accordance with the prior art.
Figure 2:
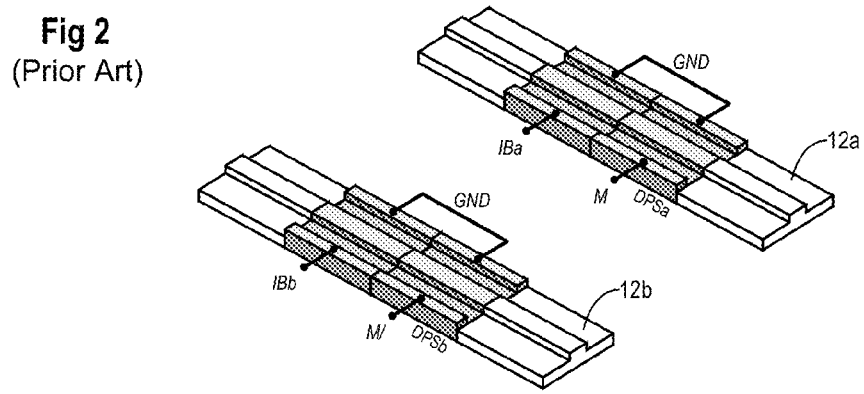
FIG. 2 is a perspective view of two branches of the optical modulator of FIG. 1.
Figure 3A:
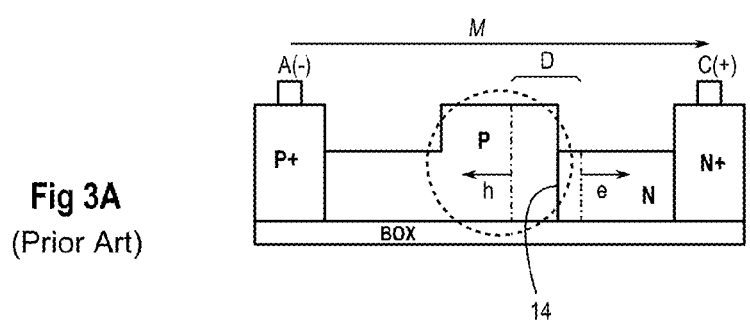
FIGS. 3A and 3B are schematic sectional views of two types of phase shifters used in the modulator of FIG. 1.

As previously mentioned, a dynamic phase shifter of the type illustrated in FIG. 3A has a negative coefficient. At rest, with a zero bias voltage, the optical action zone has a residual number of charges defined by the doping level of this zone. The application of a reverse bias voltage causes a charge evacuation out of the optical action zone. This results in a decrease in the refractive index and thus a decrease in the phase lag introduced by the optical action zone.

Thus, in a phase shifter of this type, the residual charge concentration in the optical action zone defines the dynamics of the phase shifter. Increasing the doping level of this zone results in increased dynamics, but also in an increase of the optical losses at rest.

In some applications low optical losses at rest with a high dynamic range may be desirable. To contribute to this desire, the dynamic phase shifter may include an optical action zone with zero or minimal doping, and therefore that charges be brought into the optical action zone by the control signal of the phase shifter. In other words, the dynamic phase shifter would have a positive coefficient, like a PIN phase shifter.

Figure 4A:
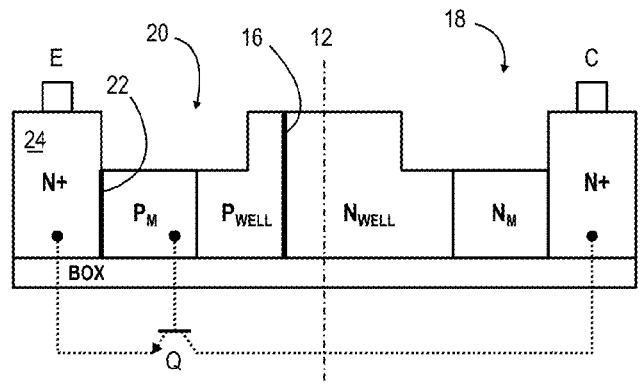
FIGS. 4A and 4B are schematic sectional and top views of a positive coefficient dynamic phase shifter in accordance with an embodiment of the present invention.

FIG. 4A is a schematic sectional view of an embodiment of a phase shifter offering a fast response and a positive coefficient. The phase shifter is based on a lateral bipolar transistor structure Q, here an NPN type. The transistor is configured so that its collector current passes through the optical action zone perpendicular to the axis of the waveguide 12. The collector current thus brings charges into the optical action zone. The charges are brought by a bipolar effect, which overcomes the charge injection effect at the origin of the slow response of PIN phase shifters.

Figure 3B:
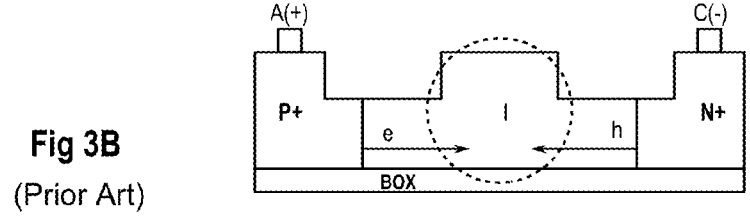

The phase shifter cross-section is similar to that of FIGS. 3A and 3B, enabling its insertion in the continuity of an inverted "T" waveguide. More specifically, the phase shifter includes a first P-N junction 16 parallel to the axis of the waveguide 12. Junction 16 is shown offset to the left of the axis and within the thicker central portion, corresponding to the optical action zone. Junction 16 is formed between an N-doped area 18 extending to the right towards a collector contact C and a P-doped area 20 extending to the left. A second P-N junction 22, parallel to junction 16, is formed outside the optical action zone between area 20, to the right, and an N-doped area 24, to the left, bearing an emitter contact E. The P-doped area 20 is connected to a base contact B, not shown in this view.

Areas 18, 20 and 24 thus form a lateral NPN transistor Q, symbolized under the structure. When a collector current is produced in this transistor, the current flows from contact C to the emitter contact E through the optical action zone. The number of charges in the optical action zone, and therefore the phase delay, increases with the collector current.

Preferably, to limit the optical losses, the doping level of the optical action zone is minimal. Thus, as shown, the areas 18 and 20 have a bulk doping level in contact with the junction 16, respectively $N_{WELL}$ and $P_{WELL}$. However, to offer a good compromise between optical performance and electrical performance, the doping level increases from the optical action zone, at the center of the structure, towards the contacts at the edges of the structure. Thus the right end of zone 18 and zone 24 have the highest level of doping, N+. Parts adjacent these ends may have an intermediate level of doping, denoted $P_M$ for area 20 and $N_M$ for area 18, so as to approach a doping gradient.

Junction 16 may be a PIN junction. In this case, the doped areas $N_{WELL}$ and $P_{WELL}$ are replaced by a single area of intrinsic semiconductor.

Figure 4B:
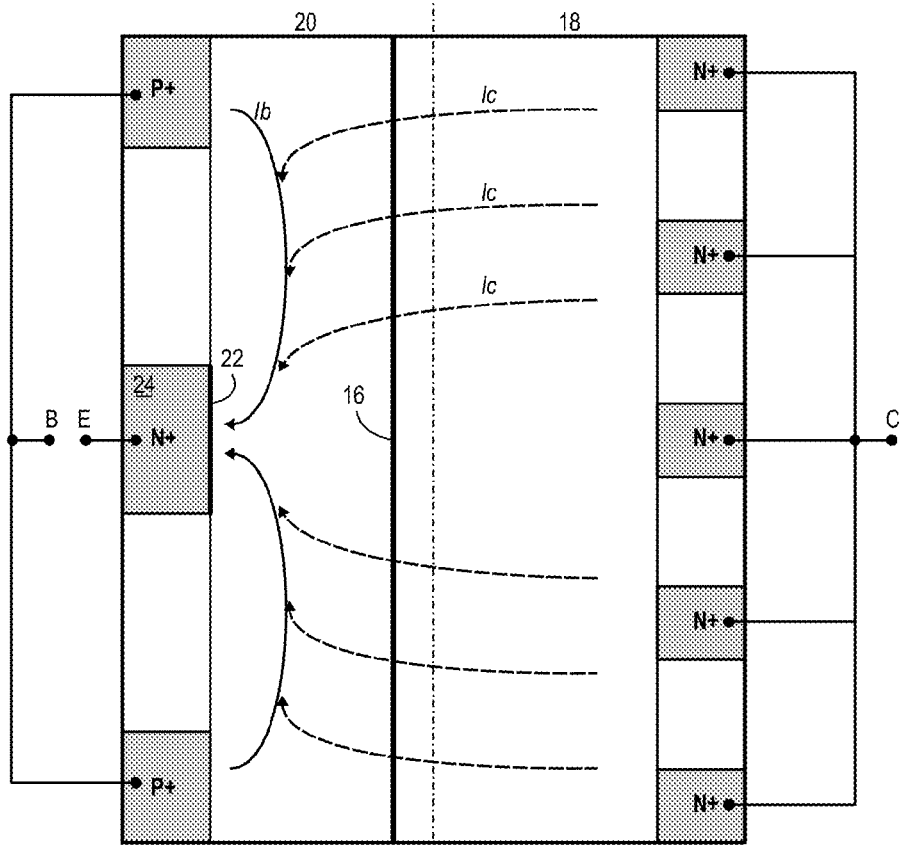

FIG. 4B is a top view of the phase shifter of FIG. 4A, showing an exemplary arrangement of the electrical contacts and the current flow. Zone 24 used for the emitter contact E partially extends over a central portion of the length of the phase shifter along the axis of the waveguide 12. Two P+ islands having a maximum P-doping level are arranged in contact with the area 20 on either side of the area 24, at the opposite ends of the phase shifter. The spaces between the P+ islands and the area 24 may be filled with insulation, as shown, or by extensions of area 20. In the latter case, the junction 22 would be formed on three faces of the area 24, a face opposite the junction 16 and a face opposite each of the P+ islands. The two P+ islands are connected to a common base terminal B. According to an alternative, area 24 may be divided into two parts replacing the P+ areas, and the P+ areas may be merged in the center.

Preferably, as shown, the collector contact C is distributed over multiple N+ islands having a maximum N-doping spread over the length of the phase shifter. The spaces between the islands are filled with insulation. This configuration reduces the parasitic capacitances and inductances of conductors used for the collector contact.

To use this structure, the emitter E is connected to a low potential, such as ground 0 or a negative potential −Vdd, and a current Ib is injected in the base B. This current establishes as a flux flowing from the P+ islands to the area 24 through the area 20. If the collector C is connected to a sufficiently high potential, for example the supply voltage Vdd, a flux of collector current Ic establishes through bipolar effect, starting at the N+ islands of area 18 and joining the base current flux Ib.

The intensity of the collector current Ic can be modulated by modulating the base current Ib. The modulation speed is then subjected to a charge injection effect at junction 22. Since junction 22 extends only over part of the length of the phase shifter, and the base current Ib may be relatively low (depending on the gain achieved by the transistor), the modulation speed may be greater than that achieved with a PIN phase shifter.

Preferably, to achieve an even higher modulation speed, the base current Ib is constant, whereby the transistor is permanently turned on, and the collector voltage is modulated instead, for example between 0 and Vdd. The collector current Ic, causing no charge injection effect, may be modulated at an even higher speed than the base current Ib. The base current is preferably adjusted to place the transistor in saturation mode, if possible given the characteristics obtained for the transistor.

If the base current Ib is constant, it is preferable that its flux in the area 20 does not reach the optical action zone where it would cause a constant concentration of charges tending to introduce optical losses. The base current flux is channeled through the area 20, mostly in the more heavily doped portion $P_M$ near the junction 22. The trajectory of this flux may be adjusted by setting the lateral position of junction 16 and the relative widths of the doped portions $P_M$ and $P_{WELL}$.

Many variations and modifications of the described embodiments will occur to those skilled in the art. For example, the conductivity types of the various areas may be reversed to form a PNP transistor structure instead of the NPN transistor. The P-N junction 16 may be replaced by a PIN junction by using intrinsic semiconductor in place of the doped areas $P_{WELL}$ and $N_{WELL}$.

That which is claimed is:

1. A method for controlling a phase shifter comprising an optical action zone coupled to an optical waveguide and a bipolar transistor configured so that collector current crosses the optical action zone transverse to an axis of the optical waveguide, the method comprising:
    applying a non-zero base-emitter bias current to the bipolar transistor; and
    modulating a collector voltage of the bipolar transistor.

2. The method according to claim 1, wherein applying a non-zero base-emitter current comprises applying a constant non-zero base-emitter current.

3. The method according to claim 1, wherein the collector current crosses the optical action zone perpendicular to the axis of the optical waveguide.

4. The method according to claim 1, wherein the phase shifter further comprises a first P-N junction parallel to the axis of the optical waveguide and in the optical action zone between a first area doped at a first conductivity type and a second area doped at a second conductivity type and a second P-N junction parallel to the first junction between the second area and a third area, and doped at the first conductivity type, and wherein the bipolar transistor comprises collector, base, and emitter terminals coupled respectively to the first, second, and third areas.

5. The method according to claim 4, wherein the first and second junctions are configured so that a flux of base-emitter current of the bipolar transistor does not extend into the optical action zone.

6. The method according to claim 4, wherein a doping level of the optical action zone increases from the optical action zone towards each of the collector, emitter, and base terminals.

7. The method according to claim 4, wherein the first and second areas extend over an entire length of the phase shifter along the axis of the optical waveguide, and wherein the third area extends over part of the length of the phase shifter.

8. The method according to claim 7, wherein the third area extends over a central portion of the length of the phase shifter; and wherein the phase shifter comprises two islands coupled to the second area on each side of the third zone, the two islands having a threshold doping level of the second conductivity type and being coupled to define, in common, the base terminal.

9. The method according to claim 7, wherein the phase shifter comprises, a plurality of islands spaced apart along the length of the phase shifter and coupled to the first area, the plurality of islands having a threshold doping level of the first conductivity type and being coupled to define, in common, the collector terminal.

10. A method for controlling a phase shifter comprising an optical action zone coupled to an optical waveguide and a bipolar transistor configured so that collector current crosses the optical action zone perpendicular to an axis of the optical waveguide, the method comprising:
    applying a constant non-zero base-emitter bias current to the bipolar transistor; and
    modulating a collector voltage of the bipolar transistor.

11. The method according to claim 10, wherein the phase shifter further comprises a first P-N junction parallel to the axis of the optical waveguide and in the optical action zone between a first area doped at a first conductivity type and a second area doped at a second conductivity type and a second P-N junction parallel to the first junction between the second area and a third area, and doped at the first conductivity type, and wherein the bipolar transistor comprises collector, base, and emitter terminals coupled respectively to the first, second, and third areas.

12. The method according to claim 11, wherein the first and second junctions are configured so that a flux of base-emitter current of the bipolar transistor does not extend into the optical action zone.

13. The method according to claim 11, wherein a doping level of the optical action zone increases from the optical action zone towards each of the collector, emitter, and base terminals.

14. The method according to claim 11, wherein the first and second areas extend over an entire length of the phase shifter along the axis of the optical waveguide, and wherein the third area extends over part of the length of the phase shifter.

15. The method according to claim 14, wherein the third area extends over a central portion of the length of the phase shifter; and wherein the phase shifter comprises two islands coupled to the second area on each side of the third zone, the two islands having a threshold doping level of the second conductivity type and being coupled to define, in common, the base terminal.

16. The method according to claim 14, wherein the phase shifter comprises, a plurality of islands spaced apart along the length of the phase shifter and coupled to the first area, the plurality of islands having a threshold doping level of the first conductivity type and being coupled to define, in common, the collector terminal.

17. A method of making a semiconductor electro-optical phase shifter comprising:
    providing an optical action zone to be coupled to an optical waveguide having an axis along a length thereof; and providing a bipolar transistor configured so that collector current crosses the optical action zone transverse to the axis of the optical waveguide.

18. The method according to claim 17, wherein the collector current is perpendicular to the axis of the optical waveguide.

19. The method according to claim 17, further comprising:
providing a first P-N junction parallel to the axis of the optical waveguide and in the optical action zone between a first area doped at a first conductivity type and a second area doped at a second conductivity type; and
providing a second P-N junction parallel to the first junction between the second area and a third area, and doped at the first conductivity type; and
wherein the bipolar transistor comprises collector, base, and emitter terminals coupled respectively to the first, second, and third areas.

20. The method according to claim 19, wherein the first and second junctions are configured so that a flux of base-emitter current of said bipolar transistor does not extend into the optical action zone.

21. The method according to claim 19, wherein a doping level of the optical action zone increases from the optical action zone towards each of the collector, emitter, and base terminals.

22. The method according to claim 19, wherein the first and second areas extend over an entire length of the phase shifter along the axis of the optical waveguide, and wherein the third area extends over part of the length of the phase shifter.

* * * * *